(12) United States Patent
Kementsietsidis et al.

(10) Patent No.: US 8,661,004 B2
(45) Date of Patent: Feb. 25, 2014

(54) REPRESENTING INCOMPLETE AND UNCERTAIN INFORMATION IN GRAPH DATA

(75) Inventors: Anastasios Kementsietsidis, New York, NY (US); Enela Pema, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/476,316

(22) Filed: May 21, 2012

(65) Prior Publication Data

US 2013/0311507 A1    Nov. 21, 2013

(51) Int. Cl.
*G06F 17/00* (2006.01)

(52) U.S. Cl.
USPC .......................... 707/694; 707/736; 707/802

(58) Field of Classification Search
USPC ......... 707/758, 714, 694, 760, 759, 791, 797, 707/798, 802, 748, 793, E17.044, E17.011, 707/E17.03, E17.017, E17.007, E17.033, 707/E17.073, 616, 778, 956, 608, 609, 821, 707/736, E17.014, E17.055; 706/45; 345/440, 619; 370/410; 717/120, 142, 717/154
See application file for complete search history.

(56) References Cited

U.S. PATENT DOCUMENTS

| | | | | |
|---|---|---|---|---|
| 7,818,352 | B2 * | 10/2010 | Krishnamoorthy et al. .. | 707/803 |
| 7,882,485 | B2 * | 2/2011 | Feblowitz et al. ............ | 717/104 |
| 8,335,754 | B2 * | 12/2012 | Dawson et al. ................ | 706/45 |
| 2002/0118688 | A1 * | 8/2002 | Jagannathan ................. | 370/410 |
| 2002/0120429 | A1 | 8/2002 | Ortoleva | |
| 2005/0266387 | A1 * | 12/2005 | Rossides ....................... | 434/323 |
| 2006/0112125 | A1 * | 5/2006 | Potok et al. ................... | 707/101 |
| 2007/0094216 | A1 * | 4/2007 | Mathias et al. ................ | 706/52 |
| 2007/0294128 | A1 | 12/2007 | Wedemeyer | |
| 2008/0010043 | A1 | 1/2008 | Thiesson et al. | |
| 2008/0040347 | A1 * | 2/2008 | Potok et al. ....................... | 707/6 |
| 2008/0109420 | A1 * | 5/2008 | Britton et al. ..................... | 707/4 |
| 2008/0126397 | A1 * | 5/2008 | Alexander et al. ............ | 707/102 |

(Continued)

OTHER PUBLICATIONS

Hing, M.M., van Harten, A, and Schuur, P.—"Reinforcement learning for Order Acceptance on a shared resource"—Neural Information Processing, 2002. ICONIP '02. Proceedings of the 9th International Conference on vol. 3 Digital Object Identifier: 10.1109/ICONIP. 2002.1202861 Publication Year: 2002 , pp. 1454-1458 vol. 3, IEEE 2002.*

(Continued)

*Primary Examiner* — Jean B Fleurantin
*Assistant Examiner* — Anh Ly
(74) *Attorney, Agent, or Firm* — August Law, LLC; George Willingham (57) ABSTRACT

A method for representing and querying incomplete and uncertain information in graph data receives a plurality of graphs containing subject nodes, object nodes and predicates extending between subject and object nodes. The subject nodes and predicates can be URIs or blank, and the object nodes can be URIs, literals or blank. Incomplete graph data sets are created by a variable into each blank subject node, each blank predicate and each blank object node, and uncertain graph data sets are created by substituting alternative values for all variables in the incomplete data graph. A query is received from a user and a naïve search of the graph data is performed for certain data. The incomplete and uncertain graphs are then used to determine potential answers and certain potential answers based on user-specified requirements. The certain answers and potential certain answers are returned to the user.

22 Claims, 5 Drawing Sheets

(56) References Cited

U.S. PATENT DOCUMENTS

| | | | |
|---|---|---|---|
| 2008/0147788 A1* | 6/2008 | Omoigui | 709/203 |
| 2008/0238923 A1* | 10/2008 | Liu et al. | 345/440 |
| 2008/0256069 A1* | 10/2008 | Eder | 707/5 |
| 2009/0012842 A1* | 1/2009 | Srinivasan et al. | 707/E17.017 |
| 2009/0020284 A1* | 1/2009 | Graf et al. | 166/250.15 |
| 2009/0157663 A1* | 6/2009 | Kate | 707/5 |
| 2009/0161741 A1 | 6/2009 | Ginis et al. | |
| 2009/0222472 A1 | 9/2009 | Aggarwal et al. | |
| 2009/0231441 A1* | 9/2009 | Walker et al. | 348/207.1 |
| 2009/0265686 A1* | 10/2009 | Lucas et al. | 717/120 |
| 2010/0036788 A1* | 2/2010 | Wu et al. | 706/47 |
| 2010/0036862 A1* | 2/2010 | Das et al. | 707/101 |
| 2010/0082651 A1 | 4/2010 | Akolkar et al. | |
| 2010/0088664 A1 | 4/2010 | Khodabandehloo et al. | |
| 2010/0198778 A1* | 8/2010 | Venugopal et al. | 707/602 |
| 2010/0324927 A1* | 12/2010 | Tinsley | 705/2 |
| 2011/0078104 A1* | 3/2011 | Honkola et al. | 706/47 |
| 2011/0166789 A1 | 7/2011 | Barrow et al. | |
| 2011/0213722 A1* | 9/2011 | Carson et al. | 705/317 |
| 2011/0289520 A1 | 11/2011 | Grigoriev et al. | |
| 2011/0314075 A1 | 12/2011 | Boldyrev et al. | |
| 2011/0320187 A1 | 12/2011 | Motik et al. | |
| 2012/0005050 A1 | 1/2012 | Boldyrev et al. | |

OTHER PUBLICATIONS

Zhaonian Zou, Jianzhong Li, Hong Gao, and Shuo Zhang—"Mining Frequent Subgraph Patterns from Uncertain Graph Data"—Knowledge and Data Engineering, IEEE Transactions on, vol. 22, Issue: 9, Digital Object Identifier: 10.1109/TKDE.2010.80 Publication Year: 2010, pp. 1203-1218.*

Ding et al, "Tracking RDF Graph Provenance using RDF Molecules", 2005 Proceedings of the Fourth International Semantic Web Conference.

Lefevre et al., "GraSS: Graph Structure Summarization", In SDM, pp. 454-465, 2010.

Wick, "Synthesis Representing Uncertainty in Databases with Scalable Factor Graphs", Masters Thesis 2009 www.cs.umass.edu/~mwick/MikeWeb/.../wick09representing.pdf.

Yuan et al., "Efficient Subgraph Search over Large Uncertain Graphs", PVLDB 4(11), 876-886 (2011).

Aggarwal. and Yu; "A Survey of Uncertain Data Algorithms and Applications", IEEE Transactions on Knowledge and Data Engineering, vol. 21, No. 5, May 2009, pp. 1-15.

* cited by examiner

REPRESENTING INCOMPLETE AND UNCERTAIN INFORMATION IN GRAPH DATA

STATEMENT REGARDING FEDERALLY SPONSORED RESEARCH

The invention disclosed herein was made with U.S. Government support under Contract No. W911NF-09-2-0053 awarded by the U.S. Department of Defense. The Government has certain rights in this invention.

FIELD OF THE INVENTION

The present invention relates to data management in graph databases.

BACKGROUND OF THE INVENTION

A goal of any dataset covering any domain or type of data is to have as complete, certain and accurate a set of data as possible given limitations on the collection and storage of the data. Scientific data, for example, are often incomplete, e.g., only certain portions of the sky have been studied by astronomers, or inaccurate, e.g., instrument readings vary by the sensitivity of each instrument. Similarly, business decisions are made using uncertain business data, e.g., when not all sales data have been reported in advance of a decision being made. Previous attempts at alleviating the problems of completeness and uncertainty have centralized the management of data in data warehouses and used data cleaning to remove inaccuracies. The advent of the Semantic Web has rendered these previous approaches useless. Incomplete and inaccurate data are available everywhere, in massive amounts, and there is no centralized control. There are, however, significant benefits in integrating and cross-linking the data. Incompleteness in the data cannot be completely eliminated. Therefore, methods are needed to handle and to compensate for incompleteness.

In the Semantic Web, the resource description framework (RDF) model is the de-facto data representation standard. In dealing with incomplete and uncertain data, RDF uses "blank nodes" as a rudimentary mechanism to support incomplete information. Due to the lack of clear semantics, this support is inadequate. In addition, existing systems provide implementations of blank node semantics that are far from the spirit of the standard. The only support of incompleteness in RDF comes in the form of probabilistic RDF data. The use of probabilities is impractical as they need to be determined and associated with the data within RDF.

SUMMARY OF THE INVENTION

Systems and methods in accordance with exemplary embodiment of the present invention use models for representing incompleteness in RDF that provide clear semantics for both the representation of incompleteness and the querying of the data. The techniques and semantics address the limitations of blank nodes and unlike existing techniques do not require any probabilities to represent incompleteness. In accordance with one exemplary embodiment, the present invention is directed to a system for representing and querying incomplete and uncertain information in graph data. The system includes a graph data input module configured to receive graph data containing a plurality of graphs. Each graph includes a subject node, an object node and a predicate extending from the subject node to the object node. In one embodiment, each subject node includes a uniform resource identifier or a blank subject node. In addition, each predicate can include a uniform resource identifier or a blank predicate, and each object node can include a uniform resource identifier, a literal or a blank object node.

The system also includes an uncertainty and incompleteness specification module in communication with the graph data input module. This uncertainty and incompleteness specification module includes an incompleteness modeler to insert a variable into each one of a plurality of graph nodes including the blank subject nodes, blank predicates and blank object nodes and an uncertainty modeler to determine alternative values for the inserted variables. In one embodiment, the incompleteness modeler includes an incomplete graph data modeler configured to generate an incomplete graph data set by inserting a distinct variable into each blank subject node, each blank predicate and each blank object node in each graph within the plurality of graphs received by the graph data input module. The uncertainty modeler can also include a partial uncertain graph data modeler configured to generate a partial uncertain graph data set containing alternative values for a portion of all variables in the incomplete data graph set. Each variable is replaced by a given group of alternative values selected from a set of alternative values that is a union of all subsets of a set of all uniform resource identifiers in the received graph data and all subsets of a set of all literals in the plurality of graphs received by the graph data input module.

In one embodiment, the uncertainty modeler is an uncertain graph data modeler configured to generate an uncertain graph data set that includes alternative values for all variables in the incomplete data graph set. Each variable is replaced by a given group of alternative values, and each group of alternative values selected from a set of alternative values that is a union of all subsets of a set of all uniform resource identifiers in the received graph data and all subsets of a set of all literals in the plurality of graphs received by the graph data input module. In one embodiment, the system further also includes a graph storage database for storing the incomplete graph data set and the uncertain graph data set.

In one embodiment, the system includes a query processing module in communication with the uncertainty and incompleteness specification module. The query processing module is configured to process user-defined queries over models generated by the incompleteness modeler and the uncertainty modeler. In one embodiment, the query processing module includes a naive evaluator to identify certain answers to the user-defined query from the graph data. Each certain answer includes a certain value obtained from a given graph in the plurality of graphs that is equivalent for any alternative value of at least one of the subject node, the object node and the predicate of that given graph. In addition, a potential answer evaluator is used to identify potential answers to the query from the graph data. Each potential answer includes two or more potential values for at least one of the subject node, the object node and the predicate of a given graph. A certain potential answer evaluator identifies certain potential answers to the query over the graph data. Each certain potential answer has a number of potential values below a prescribed threshold.

Exemplary embodiments in accordance with the present invention are also directed to a method for representing incomplete and uncertain information in graph data. According to this method, graph data containing a plurality of graphs are received. Each graph contains a subject node, an object node and a predicate extending from the subject node to the object node. An incomplete graph data set is created containing the plurality of graphs by inserting a variable into at least one of the subject node, the predicate and the object node in one or more graphs within the plurality of graphs. In addition, an uncertain graph data set is created by substituting alternative values for all variables in the incomplete data graph set. Each variable is replaced by a given group of alternative values. In one embodiment, each subject node contains a uniform resource identifier or a blank subject node. In addition, each predicate contains a uniform resource identifier or a blank predicate, and each object node can be a uniform resource identifier, a literal or a blank object node. Therefore, creating the incomplete graph data set includes inserting the variable into each blank subject node, each blank predicate and each blank object node in each graph within the plurality of graphs. In addition, each group of alternative values is selected from a set of alternative values that is a union of all subsets of a set of all uniform resource identifiers in the received graph data and all subsets of a set of all literals in the received graph data.

In one embodiment, a partial uncertain graph data set is created by substituting alternative values for a portion of all variables in the incomplete data graph. Each variable is replaced by a given group of alternative values selected from the set of alternative values. Creating the partial uncertain graph data set includes creating a plurality of partial uncertain graph data sets by substituting alternative values for variables in each one of a plurality of portions of all variables in the incomplete data set. Each portion in the plurality of portions represents a distinct portion. In one embodiment, creating the incomplete graph data set involves only inserting variables in object nodes located at graph endpoints. Each graph endpoint is a node within the graph data lacking any links extending out from that node. In one embodiment, creating an incomplete graph data set includes creating a plurality of incomplete graph data sets by inserting a variable into each blank subject node, each blank predicate and each blank object node in each one of a plurality of distinct sets of blank subject nodes, blank predicates and blank object nodes within the plurality of graphs. In addition, creating an uncertain graph data set includes creating a plurality of uncertain graph data sets, one uncertain graph data set for each incomplete graph data set.

In one embodiment, creating an uncertain graph data set includes creating a plurality of uncertain graph data sets by substituting alternative values for all variables in each one of a plurality of subsets of variables in the incomplete data graph set. Each subset of variables represents a distinct subset of variables. In one embodiment, a probabilistic graph data set is created by substituting a distinct set of alternative values for each variable in the incomplete data graph set. Each set of alternative values contains at least one alternative value selected from the set of alternative values and a pre-determined probability associated with each alternative value in that set of alternative values.

Exemplary embodiments in accordance with the present invention are also directed to a method for querying incomplete and uncertain information in graph data. According to this method, a query is received from a user over graph data containing a plurality of graphs. Each graph contains a subject node, an object node and a predicate extending from the subject node to the object node. In addition, each subject node can be a uniform resource identifier or a blank subject node. Similarly, each predicate can be a uniform resource identifier or a blank predicate, and each object node can be a uniform resource identifier, a literal or a blank object node. Certain answers to the query over the graph data are identified. Each certain answer is a certain value obtained from a given graph in the plurality of graphs that is equivalent for any alternative value of at least one of the subject node, the object node and the predicate of that given graph. In addition, potential answers to the query over the graph data are identified. Each potential answer has two or more potential values for at least one of the subject node, the object node and the predicate from a given graph. Certain potential answers to the query over the graph data are then identified. Each certain potential answer has a number of potential values below a prescribed threshold. The certain answers and the certain potential answers are communicated to the user in response to the query.

In one embodiment, the query from the user includes a user-defined certainty threshold in combination with the query. This user-defined certainty threshold is a maximum amount of acceptable uncertainty in any given query answer. The prescribed threshold is calculated based upon the user-defined certainty threshold. In one embodiment, an incomplete graph data set is created containing the plurality of graphs by inserting a variable into each blank subject node, each blank predicate and each blank object node in each graph within the plurality of graphs. An uncertain graph data set is created by substituting alternative values for all variables in the incomplete data graph. Each variable is replaced by a given group of alternative values. Each group of alternative values is selected from a set of alternative values that is a union of all subsets of a set of all uniform resource identifiers in the received graph data and all subsets of a set of all literals in the received graph data.

In one embodiment, identifying potential answers to the query further includes processing the query over the incomplete data set to identify the potential answers. Each potential answer includes a variable in a given graph in at least one of the subject node, the object node and the predicate of that given graph that can yield the two or more potential values. In one embodiment, identifying the certain potential answers to the query includes evaluating the variable associated with each potential answer using the uncertain graph data set to identify variables having the number of potential values below the prescribed threshold.

DETAILED DESCRIPTION

Systems and methods in accordance with the present invention provide for the representation of incomplete and uncertain data in a graph database such as a resource description framework (RDF) database and for the processing of queries over the incomplete and uncertain graphs within RDF. RDF is a framework or language for representing information or data, for example about resources, in a networked computing environment such as the Internet or World Wide Web. RDF provides a simple and powerful model for managing large amounts of data or resources. Suitable network or web-based resources include, but are not limited to, metadata such as the title, author, and modification date of a Web page, copyright and licensing information about a Web document, the availability of a shared resource, information about products for sale, communication protocol information, customer information including name, location and demographic information, business information, on-line catalogues, publically available government records, medical records as well as data about cars, businesses, people and news events. RDF provides a common framework for expressing this information so it can be exchanged between applications without loss of meaning, yielding the ability to exchange or communication to applications, i.e., computer applications, other than those for which it was originally created.

Figure 1:
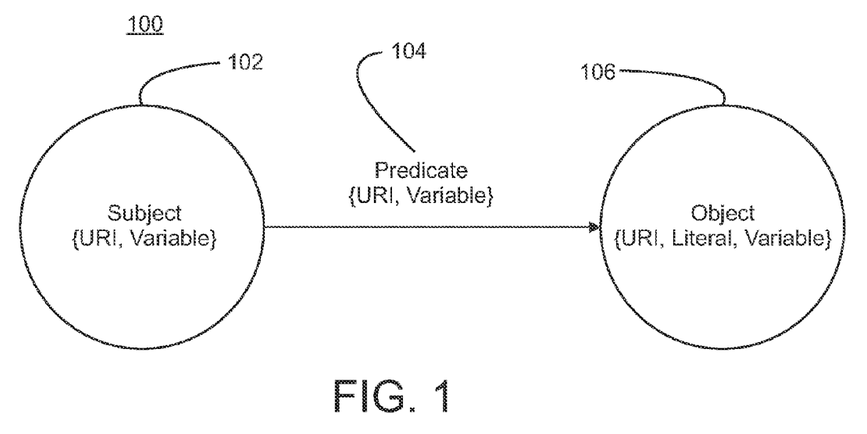
FIG. 1 is a schematic representation of an embodiment of a resource description framework graph for use in accordance with the present invention.

Referring initially to FIG. 1, the data contained in an RDF are arranged into one or more graphs 100. The fundamental unit of each graph is a three-part graph, i.e., a triple, having a subject 102, a predicate 104 and an object 106. Therefore, RDF uses directed multigraphs. In one embodiment, the direction of the graphs is ignored, and the graphs are interpreted as undirected. Each triple can be a stand alone triple in the graph data or can be combined with other triples in a nested or branching type of arrangement to illustrate subjects with multiple predicates or objects and objects that also are subjects. For a given triple, the subject and object are nodes in the graph, and the predicate represents a connection or transitions between these nodes. Therefore, RDF is used to describe the value of properties associated with things, and resources such as Web-based resources, i.e., the things, are described by specifying those properties and values. In RDF the subject is the node or portion of the triple that identifies the thing the statement or graph is about. The predicate identifies the property or characteristic of the subject that the graph specifies, and the subject identifies the value of that property.

Each node can have one or more predicates extending into or out from that node. A given subject or predicate can be represented as a uniform resource identifier (URI) or a variable, and objects can be represented by a URI, a variable of a literal. In one embodiment, a literal is a simple string of information and represents an end-point or "leaf node" in the RDF graph. For example, a web-page without any outlinks is an example of a literal. Therefore, RDF facilitates the identification of objects using the standard Web identifiers—URIs. In addition, resources are described using simple properties and property values. RDF also facilitates the use of a machine processable extensible mark-up language (XML) based syntax for recording and exchanging the graphs.

Figure 2:
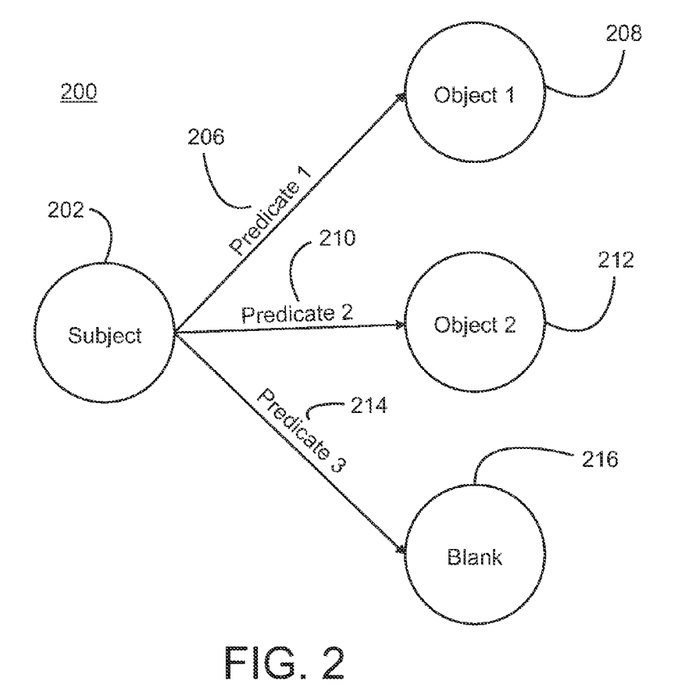
FIG. 2 is a schematic representation of an embodiment of graph data illustrating incomplete data.

When the nodes, i.e., subject and objects, or predicate in a given graph do not contain a value, that graph is incomplete. In addition, when a given node or predicate within a graph can have more than one value, that graph is uncertain. Therefore, incompleteness is the lack of full knowledge within a graph database, and uncertainty is the existence of conflicting information within a graph database. Incomplete and uncertain data can result from inherent errors in machine generated data and from the heterogeneous and conflicting nature of data integrated from different independent sources, e.g., the combining of RDF graphs. Referring to FIG. 2, an example of an incomplete data graph 200 is illustrated. The subject 202 has a first outgoing predicate 206 extending to a first object 208, a second outgoing predicate 210 extending to a second object 212 and a third outgoing predicate 214 extending to a blank object 216. This blank object represents the incompleteness in the graph as its value, i.e., URI or literal, is unknown. For example, the subject node represents a leader of an organization, and each predicate describes a subordinate in that organization. The blank node indicates that one of these individuals in the organization is unknown. Alternatively, the subject represents a given individual, and each predicate represents a quality associated with that individual, e.g., age, residence, job. The blank node is associated with a quality that is unknown, for example, the individual's age is unknown.

Figure 3:
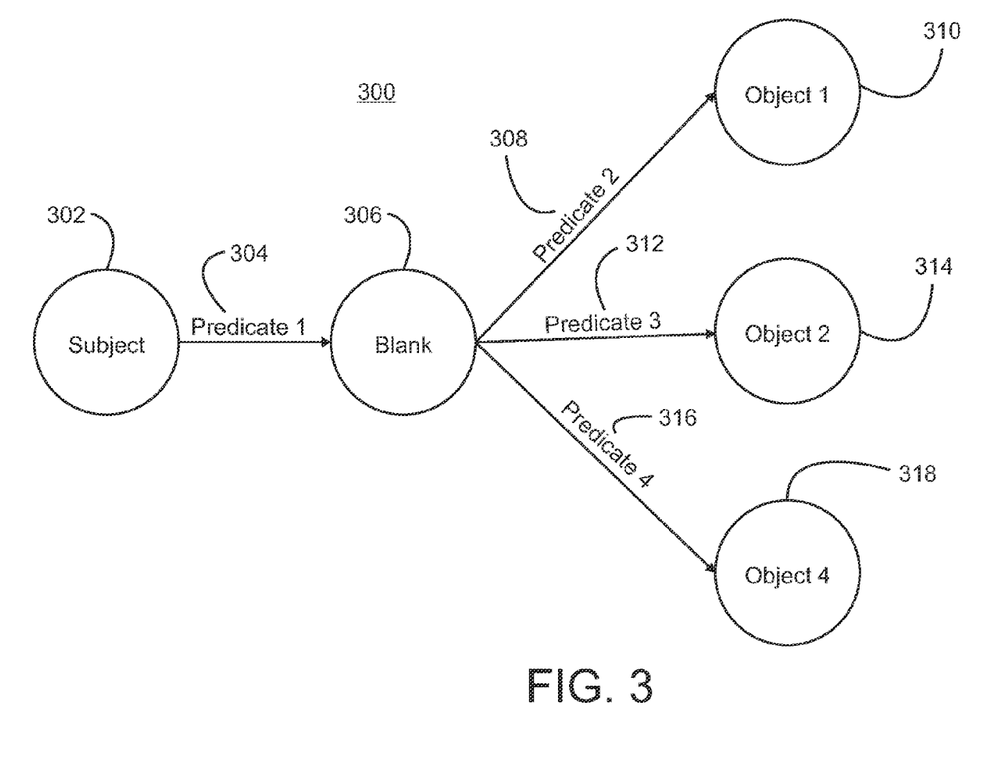
FIG. 3 is a schematic representation of an embodiment of graph data illustrating uncertain data.

In addition to incompleteness, the data graph of FIG. 2 also illustrates uncertainty when the blank node can represent more than one value. For example, the age of the individual can potentially be two or more values or the identity of the person in the organization can be two or more persons. Only one value is completely correct; however, it may not be required or desired to be completely correct of all information in a data graph. For example, it may be acceptable to know the person's age with a 50% probability or within a given range of ages. Referring to FIG. 3, another data graph 300 illustrating uncertainty in the values of a given node is illustrated. A subject node 302 has a single first predicate 304 extending to a blank node 306. Three edges extend from the blank node, a first predicate 308 extending from a first object node 310, a second predicate 312 extending to a second object node 314 and a third predicate 316 extending to a third object node 316. The blank node 306 makes the graph incomplete and can also contain multiple alternative answers making this data graph uncertain as well. This structure can arise in table-based data, where the object nodes represent columns of data in a graph having multiple rows. The row is specified in the blank node.

Figure 4:
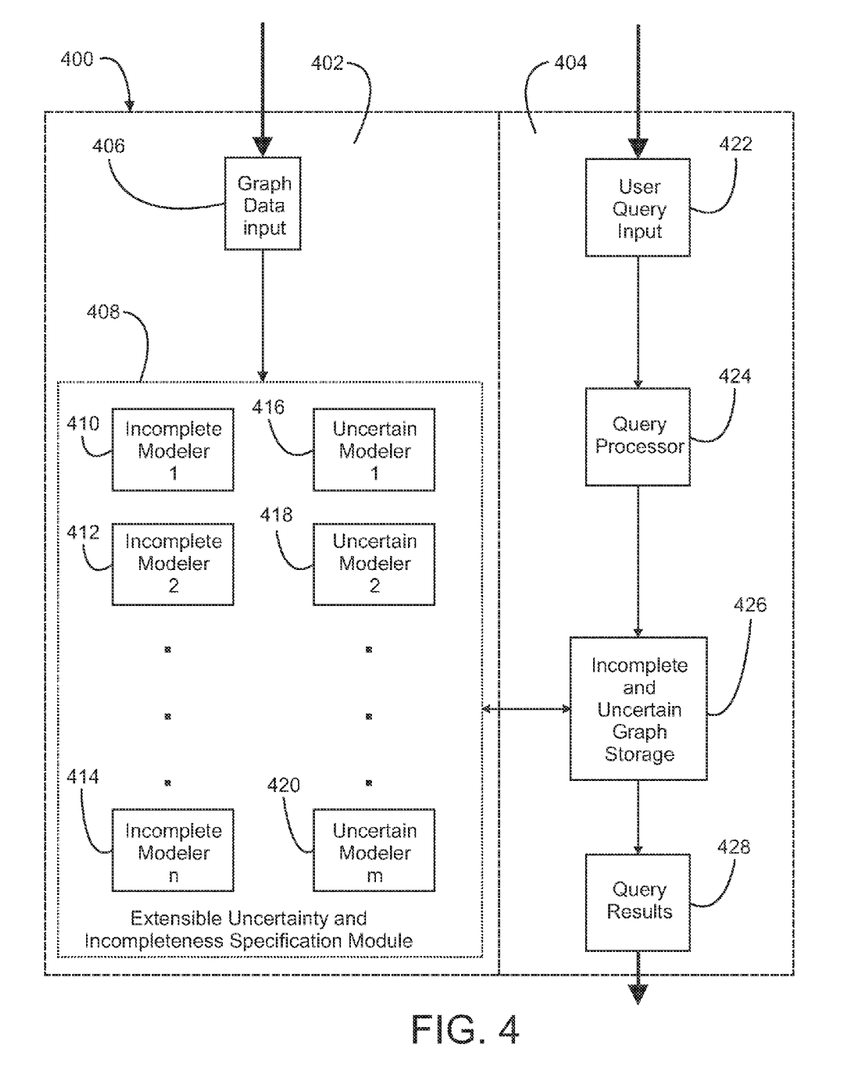
FIG. 4 is a schematic representation of a system for representing and querying incomplete and uncertain data in accordance with the present invention.
Figure 5:
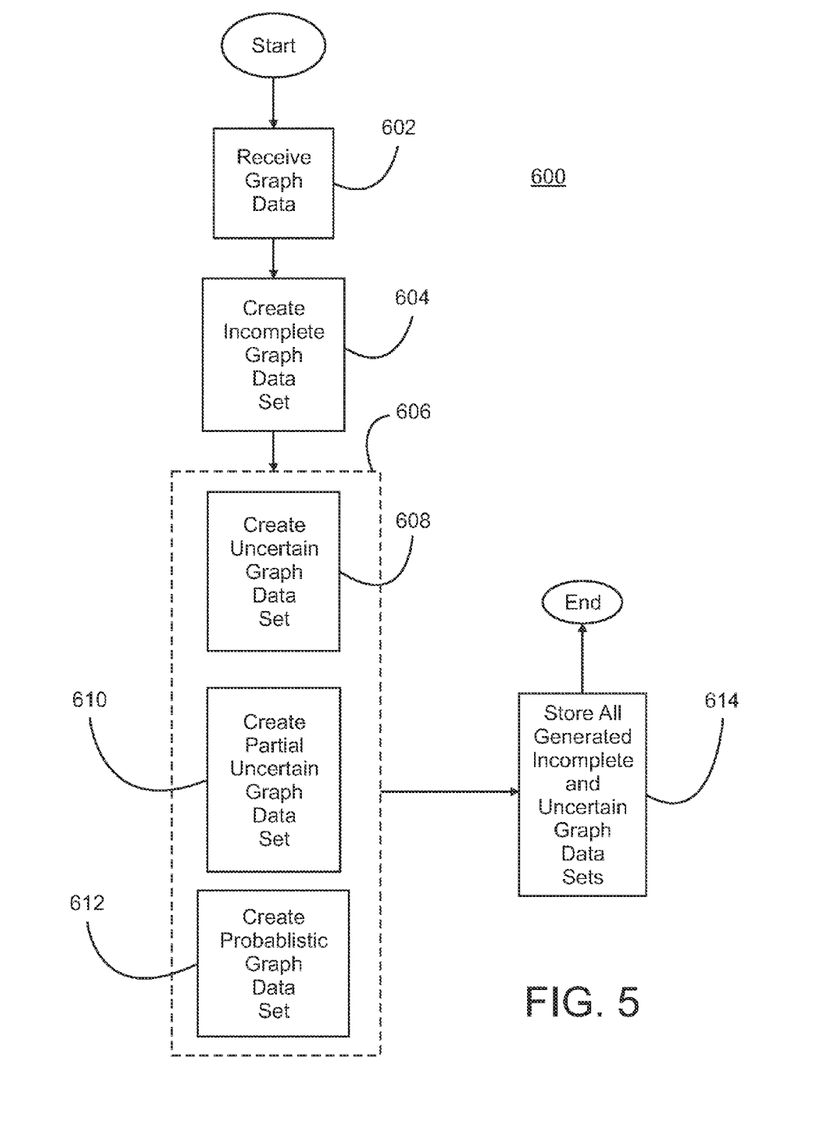
FIG. 5 is flow chart illustrating an embodiment of a method for representing incomplete and uncertain graph data in accordance with the present invention.

Exemplary embodiments of systems and methods in accordance with the present invention provide for the representation of incompleteness and uncertainty in RDF graph data and for the extraction, i.e., querying, of information from otherwise and uncertain RDF graph data. Referring to FIG. 4, an exemplary embodiment of a system for representing and querying incomplete and uncertain information in graph data 400 in accordance with the present invention is illustrated. This system includes a graph data representation portion 402 for receiving and representing graph data and a graph data query portion 404 for receiving user-defined queries and processing these queries using the generated graph data representations. Both the graph data representation portion and the graph data query portion can be executing as a single application on a single computing system or within a single domain or can be formed as a distributed computing system. The graph data representation portion includes at least one graph data input module 406 that is in communication with one or more data sources or databases across one or more networks. The graph data input module receives graph data from these data sources. These graph data include a plurality of graphs. Each graph is arranged as a triple as discussed above and includes a subject node, an object node and a predicate extending from the subject node to the object node. Each subject node can be a uniform resource identifier (URI) or a blank subject node. Each predicate can be a URI or a blank predicate, and each object node can be a URI, a literal or a blank object node. Therefore, for given set of graph data input, there is a set of URI's and a set of literals defined as the union of URI's and literals across all nodes and predicates. There is also a set of blank nodes and blank predicates from the graph data.

The data representation portion also includes an uncertainty and incompleteness specification module 408 that is in communication with the graph data input module. The uncertainty and incompleteness specification module can receive graph data from the graph data input module and contains a plurality of modelers for processing the graph data. The uncertainty and incompleteness specification module is extensible, because additional modelers can be added as desired for a given type or number of generated data graph. Each one of these modelers can be used to create a distinct type of modified data graph or a distinct instance of a single type of data graph. In one embodiment, these modelers are configured as a computer application running on one or more computing systems. The uncertainty and incompleteness specification module includes at least one and preferably a plurality of incompleteness modelers 400,412,414 to insert a variable into each one of a plurality of graph nodes selected from the blank subject nodes, blank predicates and blank object nodes. In one embodiment, the incompleteness modeler is an incomplete graph data modeler configured to generate an incomplete graph data set by inserting a distinct variable into each blank subject node, each blank predicate and each blank object node in each graph within the plurality of graphs received by the graph data input module. Therefore, each blank node within the graph data is assigned a unique variable that can be solved under different conditions to determine one or more potential values for that node. These different conditions are referred to as worlds, i.e., in one world that value of that node is x and in another world the value of that node is y.

In addition, the uncertainty and incompleteness specification module includes at least one and preferably a plurality of uncertainty modelers 416,418,420 to determine alternative values for the inserted variables. These are values for the blanks nodes and the variables in the blank nodes for each one of the plurality of worlds. In one embodiment, the uncertainty modeler is an uncertain graph data modeler that generates an uncertain graph data set containing alternative values for all variables in the incomplete data graph set. Therefore, all nodes and all predicates having variables assigned by the incompleteness modeler are covered. Each variable is replaced by a given group of alternative values, and each group of alternative values is selected from a set of alternative values that is a union of all subsets of a set of all uniform resource identifiers in the received graph data and all subsets of a set of all literals in the plurality of graphs received by the graph data input module.

In addition to covering all variables in all nodes and predicates, a subset or portion of all variables can be covered. In one embodiment, the uncertainty modeler is a partial uncertain graph data modeler that generates a partial uncertain graph data set containing alternative values for a portion of all variables in the incomplete data graph set. Again, each variable is replaced by a given group of alternative values selected from the set of alternative values that is a union of all subsets of a set of all uniform resource identifiers in the received graph data and all subsets of a set of all literals in the plurality of graphs received by the graph data input module. Any give subset of variables can be chosen, and multiple partial uncertain graph data sets can be generated using different portions of the variables that are either overlapping or mutually exclusive. In one embodiment, the partial uncertain graph data modeler substitutes alternative values only in variables located in object nodes located at graph endpoints. Each graph endpoint is a node within the graph data lacking any links extending out from that node. These graph endpoint nodes can be analogized to leaf nodes in tree architecture.

Another type of uncertainty modeler is a probabilistic graph modeler that creates a probabilistic graph data set having a distinct set of alternative values for each variable or subset of variables in the incomplete data graph set. Each set of alternative values includes at least one alternative value selected from the set of alternative values containing a union of all subsets of a set of all uniform resource identifiers in the received graph data and all subsets of a set of all literals in the plurality of graphs received by the graph data input module. Each alternative values is paired with a pre-determined probability associated with each alternative value in that set. This probability is the probability that the associated alternative value is the true or certain value for that variable and is determined in advance and assigned to the variable. Other modelers can also be included to create additional or alternative incomplete and uncertain graph data sets. Producing a variety of graph data sets can yield alternative analysis and results during a given graph data query. These alternative results can be compared, contrasted and combined to yield a more effective and accurate analysis.

The graph data query portion 404 includes a user query input 422 that is in communication with one or more users across one or more networks. The user query input receives user-defined queries over the graph data inputted to the graph data representation portion. In addition to specify the type or content of the desired data, users specify the accuracy or uncertainty that can be tolerated in any given response to the submitted inquiry. The graph data query portion includes a query processing module 424 in communication with the user query input and a graph storage database 426 containing the incomplete graph data set and the uncertain graph data sets generated by the various modelers in the uncertainty and incompleteness specification module. Both the query processing module and the graph storage database are in communication with each other and with the uncertainty and incompleteness specification module. The query processing module processes the received user-defined queries over models generated by the incompleteness modelers and the uncertainty modelers.

In one embodiment, the query processing module includes a plurality of separate evaluators to be used in processing a given query. These evaluators are run in series or in parallel to more efficiently process a query. For query answers that are known and do not vary across the potential worlds, these answers are extracted using a naive evaluator. The naïve evaluator identifies certain answers to the user-defined query from the graph data. Each certain answer is a certain value obtained from a given graph in the plurality of graphs that is equivalent for any alternative value of any subject node, object node, predicate or combination of subject node, object node or predicate of that given graph. Therefore, changing variables or alternative answers does not change the certain answers. With the certain answers determined, the query processing module looks at the uncertain answers. A potential answer evaluator identifies potential answers to the query from the graph data. Each potential answer, i.e., variable in the graph, represents two or more potential values for at least one of the subject node, the object node and the predicate of a given graph.

The potential answer can represent a given degree of certainty. For example, if only two values are associated with the potential answer, then the certainty is 50%. Similarly, four values represent a certainty of 25%. In addition, a given value can appear more than once, and even though the there are two potential values; one value appears in 80% of the worlds. The degree of certainty is important in deterring which answers are suitable or acceptable answers to a given query. Therefore, a certain potential answer evaluator is used to identify certain potential answers to the query over the graph data. Each certain potential answer has a number of potential values below a prescribed threshold or potential values that appear a given percentage of the time. This prescribed threshold or percentage corresponds to or is determined from an acceptable level of uncertainty communicated from the user with the inquiry. The graph data query portion 404 also includes a query results output model 428 to communicate the query results to the user.

Figure 6:
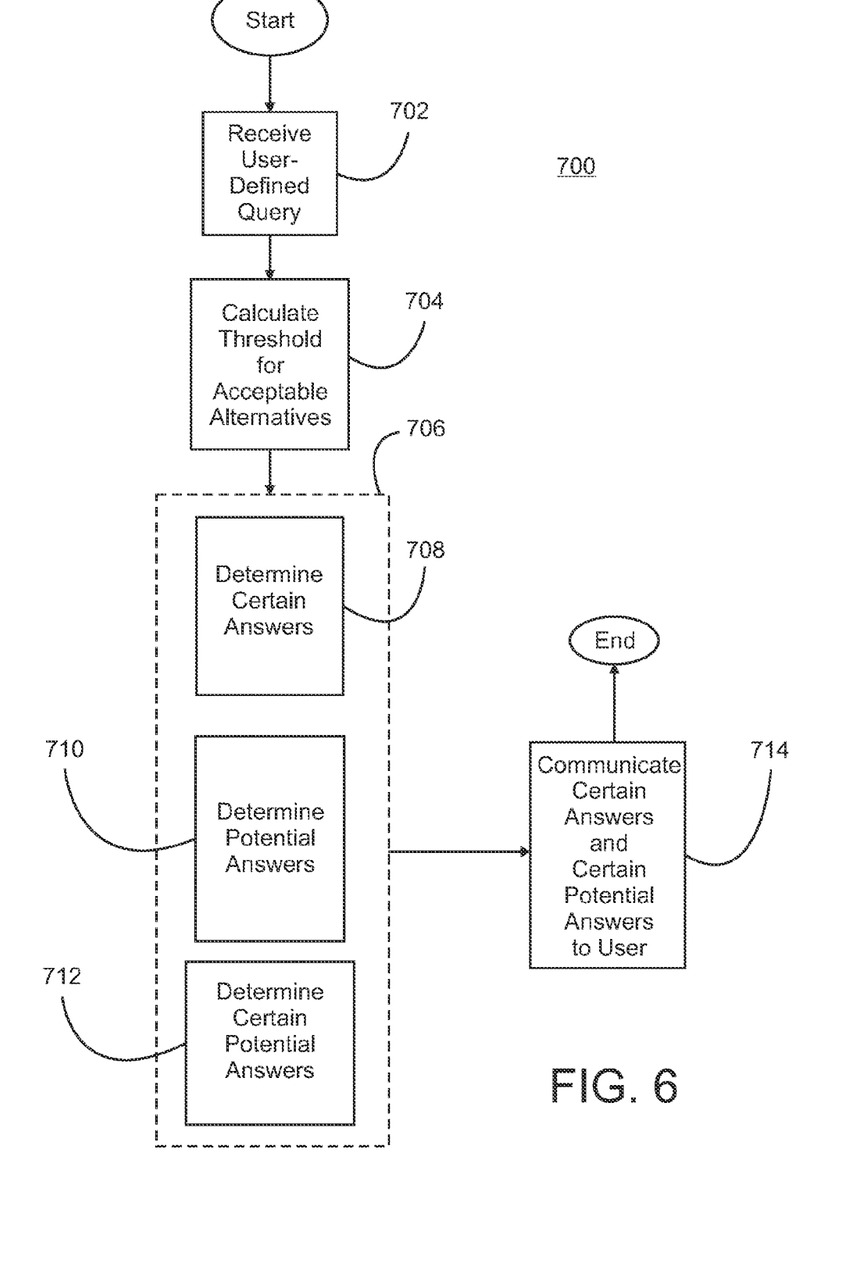
FIG. 6 is flow chart illustrating an embodiment of a method for querying incomplete and uncertain graph data in accordance with the present invention.

Referring to FIG. 6, in one exemplary embodiment, the present invention is directed to a method for representing incomplete and uncertain information in graph data 600, using for example, systems for representing and querying incomplete and uncertain information in graph data in accordance with the present invention. Graph data containing a plurality of graphs are received 602. Each graph includes a subject node, an object node and a predicate extending from the subject node to the object node. Regarding the content of these nodes, each subject node can include a uniform resource identifier, i.e., a Web page, or can be a blank subject node. In addition, each predicate can include a uniform resource identifier or can be a blank predicate, and each object node can include a uniform resource identifier, a literal, e.g., simple strings or web pages with no links, or can be a blank object node.

At least one or alternatively a plurality of incomplete graph data sets is created 604. Each incomplete graph data set includes the plurality of graphs, or a subset of the plurality of graphs and is created by inserting a variable into each blank subject node, each blank predicate and each blank object node in each graph within the plurality of graphs. In one embodiment, variables are only inserted into in object nodes located at graph endpoints. Each graph endpoint is a node within the graph data lacking any links extending out from that node. When a plurality of incomplete graph data sets are created, a variable is inserted into each blank subject node, each blank predicate and each blank object node in each one of a plurality of distinct sets of blank subject nodes, blank predicates and blank object nodes within the plurality of graphs. In one embodiment, variables are used not only for blank nodes but also for any unknown or uncertain nodes irrespectively of whether a blank node pre-exists or not.

Having created one or more incomplete graph data sets, one or more uncertain graph data sets are created 606. This includes creating at least one or a plurality of uncertain graph data sets by substituting alternative values for all variables in the incomplete data graph 608. Each variable is replaced by a given group of alternative values, and each group of alternative values is selected from a set of alternative values that is a union of all subsets of a set of all uniform resource identifiers in the received graph data and all subsets of a set of all literals in the received graph data. When a plurality of uncertain graph data sets is created, one uncertain graph data set is created for each incomplete graph data set. Alternatively, a plurality of uncertain graph data sets is created for a single incomplete graph data set. The creation of uncertain graphs also includes creating one or a plurality of partial uncertain graph data sets by substituting alternative values for a portion of all variables in the incomplete data graph. Each variable is replaced by a given group of alternative values selected from the set of alternative values. In one embodiment, alternative values are only substituted in variables located in object nodes located at graph endpoints. Each graph endpoint is a node within the graph data lacking any links extending out from that node.

In one embodiment, a plurality of partial uncertain graph data sets is created by substituting alternative values for variables in each one of a plurality of portions of all variables in the incomplete data set. Each portion in the plurality of portions comprising a distinct portion or the portions can partially overlap. In one embodiment, alternative values are substituted for all variables in each one of a plurality of subsets of variables in the incomplete data graph set. Each subset of variables can be a distinct subset of variables or can overlap.

The creation of the uncertain graph data sets also includes creating at least one or a plurality of probabilistic graph data sets 612 by substituting a distinct set of alternative values for each variable in one or more of the incomplete data graph sets. Each set of alternative values includes at least one alternative value selected from the set of alternative values and a predetermined probability associated with each alternative value in that set of alternative values. All of the created incomplete and uncertain data graphs sets are then stored in one or more databases 614 for use in processing user defined queries.

Referring to FIG. 7, exemplary embodiments in accordance with the present invention are directed to a method for querying incomplete and uncertain information in graph data 700. A query is received 702 from a user. This query is over the graph data that includes a plurality of graphs, each graph comprising the subject node, object node and predicate extending from the subject node to the object node as discussed above. The user-defined query also includes a user-defined certainty threshold in combination with the query. The user-defined certainty threshold comprising a maximum amount of acceptable uncertainty in any given query answer. Based upon this user acceptable uncertainty, the prescribed threshold that is acceptable for any alternative answer is calculated 704.

The query is then processed 706 over the graph data including the incomplete and uncertain graph data sets that were created. Initially, certain answers to the query are determined over the graph data 708. Each certain answer is a certain value obtained from a subject node, predicate or object node of a given graph in the plurality of graphs. This certain value is equivalent or consistent for any alternative value of at least one of the subject node, the object node and the predicate of that given graph.

Having identified the certain answers, potential answers 710 to the query are determined over the graph data. Each potential answer represents two or more potential values for at least one of the subject node, the object node and the predicate from a given graph. Therefore, the value of a subject, object or predicate can vary among the various worlds. Having found potential answers, certain potential answers to the query are identified 712 over the graph data. Each certain potential answer having a number of potential values below a prescribed threshold, as calculated based upon the calculate threshold from the user-defined input.

In one embodiment, an incomplete graph data set or sets are created as described herein including the plurality of graphs by inserting a variable into each blank subject node, each blank predicate and each blank object node in each graph within the plurality of graphs. In addition, an uncertain graph data set or sets are created as described herein by substituting alternative values for all variables in the incomplete data graph. Each variable is replaced by a given group of alternative values, and each group of alternative values is selected from a set of alternative values comprising a union of all subsets of a set of all uniform resource identifiers in the received graph data and all subsets of a set of all literals in the received graph data. Having created these graph data sets, the query is processed over the incomplete data set to identify the potential answers, and the variable associated with each potential answer is evaluated using the uncertain graph data set to identify variables having the number of potential values below the prescribed threshold. Having identified the certain and acceptable potential answers to the query, the certain answers and the certain potential answers are communicated to the user in response to the query 714.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for representing and querying incomplete and uncertain information in graph data in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for representing incomplete and uncertain information in graph data, the method comprising:

receiving graph data comprising a plurality of graphs, each graph comprising a subject node, an object node and a predicate extending from the subject node to the object node; and using a computer system comprising one or more processors running a computer application to:

create an incomplete graph data set comprising the plurality of graphs by inserting a variable into at least one of the subject node, the predicate and the object node in one or more graphs within the plurality of graphs; and create an uncertain graph data set from the incomplete graph data set by substituting alternative values for all variables in the incomplete data graph set, wherein each variable is replaced by a given group of alternative values each group of alternative values selected from a set of alternative values comprising a union of all subsets of a set of all uniform resource identifiers in the received graph data and all subsets of a set of all literals in the received graph data;

wherein: the step of creating an incomplete graph data set further comprises creating a plurality of incomplete graph data sets by inserting a variable into each blank subject node, each blank predicate and each blank object node in each one of a plurality of distinct sets of blank subject nodes, blank predicates and blank object nodes within the plurality of graphs; and the step of creating an uncertain graph data set further comprises creating a plurality of uncertain graph data sets, one uncertain graph data set for each incomplete graph data set.

2. The method of claim 1, wherein:

each subject node comprises a uniform resource identifier or a blank subject node, each predicate comprises a uniform resource identifier or a blank predicate and each object node comprises a uniform resource identifier, a literal or a blank object node; and to create the incomplete graph data set further comprises inserting the variable into each blank subject node, each blank predicate and each blank object node in each graph within the plurality of graphs.

3. The method of claim 1, wherein the method further comprises creating a partial uncertain graph data set by substituting alternative values for a portion of all variables in the incomplete data graph, wherein each variable is replaced by a given group of alternative values selected from the set of alternative values.

4. The method of claim 3, wherein the step of creating the partial uncertain graph data set further comprises creating a plurality of partial uncertain graph data sets by substituting alternative values for variables in each one of a plurality of portions of all variables in the incomplete data set, each portion in the plurality of portions comprising a distinct portion.

5. The method of claim 1, wherein the step of creating the incomplete graph data set further comprises only inserting variables in object nodes located at graph endpoints, each graph endpoint comprising a node within the graph data lacking any links extending out from that node.

6. The method of claim 1, wherein the step of creating an uncertain graph data set further comprises creating a plurality of uncertain graph data sets by substituting alternative values for all variables in each one of a plurality of subsets of variables in the incomplete data graph set, each subset of variables comprising a distinct subset of variables.

7. The method of claim 1, wherein the method further comprises creating a probabilistic graph data set by substituting a distinct set of alternative values for each variable in the incomplete data graph set, wherein each set of alternative values comprises at least one alternative value selected from the set of alternative values and a pre-determined probability associated with each alternative value in that set of alternative values.

8. A non-transitory computer-readable storage medium containing a computer-readable code that when read by a computer causes the computer to perform a method for representing incomplete and uncertain information in graph data, the method comprising:
receiving graph data comprising a plurality of graphs, each graph comprising a subject node, an object node and a predicate extending from the subject node to the object node; creating an incomplete graph data set comprising the plurality of graphs by inserting a variable into at least one of the subject node, the predicate and the object node in one or more graphs within the plurality of graphs; and
creating an uncertain graph data set from the incomplete graph data set by substituting alternative values for all variables in the incomplete data graph set, wherein each variable is replaced by a given group of alternative values, each group of alternative values selected from a set of alternative values comprising a union of all subsets of a set of all uniform resource identifiers in the received graph data and all subsets of a set of all literals in the received graph data;
wherein: the step of creating an incomplete graph data set further comprises creating a plurality of incomplete graph data sets by inserting a variable into each blank subject node, each blank predicate and each blank object node in each one of a plurality of distinct sets of blank subject nodes, blank predicates and blank object nodes within the plurality of graphs; and the step of creating an uncertain graph data set further comprises creating a plurality of uncertain graph data sets, one uncertain graph data set for each incomplete graph data set.

9. The non-transitory computer-readable storage medium of claim 8, wherein:
each subject node comprises a uniform resource identifier or a blank subject node, each predicate comprises a uniform resource identifier or a blank predicate and each object node comprises a uniform resource identifier, a literal or a blank object node;
the step of creating the incomplete graph data set further comprises inserting the variable into each blank subject node, each blank predicate and each blank object node in each graph within the plurality of graphs.

10. The non-transitory computer-readable storage medium of claim 8, wherein the method further comprises creating a partial uncertain graph data set by substituting alternative values for a portion of all variables in the incomplete data graph, wherein each variable is replaced by a given group of alternative values selected from the set of alternative values.

11. The non-transitory computer-readable storage medium of claim 10, wherein the step of creating the partial uncertain graph data set further comprises creating a plurality of partial uncertain graph data sets by substituting alternative values for variables in each one of a plurality of portions of all variables in the incomplete data set, each portion in the plurality of portions comprising a distinct portion.

12. The non-transitory computer-readable storage medium of claim 8, wherein the step of creating the incomplete graph data set further comprises only inserting variables in object nodes located at graph endpoints, each graph endpoint comprising a node within the graph data lacking any links extending out from that node.

13. The non-transitory computer-readable storage medium of claim 8, wherein the step of creating an uncertain graph data set further comprises creating a plurality of uncertain graph data sets by substituting alternative values for all variables in each one of a plurality of subsets of variables in the incomplete data graph set, each subset of variables comprising a distinct subset of variables.

14. The non-transitory The computer-readable storage medium of claim 8, wherein the method further comprises creating a probabilistic graph data set by substituting a distinct set of alternative values for each variable in the incomplete data graph set, wherein each set of alternative values comprises at least one alternative value selected from the set of alternative values and a pre-determined probability associated with each alternative value in that set of alternative values.

15. A method for querying incomplete and uncertain information in graph data, the method comprising:
using a computing system comprising one or more processors running a computer application to:
create an incomplete graph data set comprising the plurality of graphs by inserting a variable into each blank subject node, each blank predicate and each blank object node in each graph within the plurality of graphs; and
create an uncertain graph data set from the incomplete data graph set by substituting alternative values for all variables in the incomplete data graph, wherein each variable is replaced by a given group of alternative values, each group of alternative values selected from a set of alternative values comprising a union of all subsets of a set of all uniform resource identifiers in the received graph data and all subsets of a set of all literals in the received graph data;
receiving a query from a user over graph data comprising a plurality of graphs, each graph comprising a subject node, an object node and a predicate extending from the subject node to the object node, each subject node comprising a uniform resource identifier or a blank subject node, each predicate comprising a uniform resource identifier or a blank predicate and each object node comprising a uniform resource identifier, a literal or a blank object node;
identifying certain answers to the query over the graph data, each certain answer comprising a certain value obtained from a given graph in the plurality of graphs that is equivalent for any alternative value of at least one of the subject node, the object node and the predicate of that given graph;
identifying potential answers to the query over the graph data by processing the query over the incomplete data set, each potential answer comprising two or more potential values for at least one of the subject node, the object node and the predicate from a given graph;
identifying certain potential answers to the query over the graph data using the uncertain graph data set, each certain potential answer having a number of potential values below a prescribed threshold; and
communicating the certain answers and the certain potential answers to the user in response to the query.

16. The method of claim 15, wherein:
the step of receiving the query from the user further comprises receiving a user-defined certainty threshold in combination with the query, the user-defined certainty threshold comprising a maximum amount of acceptable uncertainty in any given query answer; and
the method further comprises calculating the prescribed threshold based upon the user-defined certainty threshold.

17. The method of claim 15, wherein the step of identifying potential answers to the query further comprises processing the query over the incomplete data set to identify the potential answers, each potential answer comprising a variable in a given graph in at least one of the subject node, the object node and the predicate of that given graph that can yield the two or more potential values.

18. The method of claim 15, wherein the step of identifying the certain potential answers to the query further comprises evaluating the variable associated with each potential answer using the uncertain graph data set to identify variables having the number of potential values below the prescribed threshold.

19. A non-transitory computer-readable storage medium containing a computer-readable code that when read by a computer causes the computer to perform a method for querying incomplete and uncertain information in graph data, the method comprising:
- creating an incomplete graph data set comprising the plurality of graphs by inserting a variable into each blank subject node, each blank predicate and each blank object node in each graph within the plurality of graphs;
- creating an uncertain graph data set from the incomplete data graph set by substituting alternative values for all variables in the incomplete data graph, wherein each variable is replaced by a given group of alternative values, each group of alternative values selected from a set of alternative values comprising a union of all subsets of a set of all uniform resource identifiers in the received graph data and all subsets of a set of all literals in the received graph data;
- receiving a query from a user over graph data comprising a plurality of graphs, each graph comprising a subject node, an object node and a predicate extending from the subject node to the object node, each subject node comprising a uniform resource identifier or a blank subject node, each predicate comprising a uniform resource identifier or a blank predicate and each object node comprising a uniform resource identifier, a literal or a blank object node;
- identifying certain answers to the query over the graph data, each certain answer comprising a certain value obtained from a given graph in the plurality of graphs that is equivalent for any alternative value of at least one of the subject node, the object node and the predicate of that given graph;
- identifying potential answers to the query over the graph data by processing the query over the incomplete data set, each potential answer comprising two or more potential values for at least one of the subject node, the object node and the predicate from a given graph;
- identifying certain potential answers to the query over the graph data using the uncertain graph data set, each certain potential answer having a number of potential values below a prescribed threshold; and
- communicating the certain answers and the certain potential answers to the user in response to the query.

20. The non-transitory computer-readable storage medium of claim 19, wherein:
- the step of receiving the query from the user further comprises receiving a user-defined certainty threshold in combination with the query, the user-defined certainty threshold comprising a maximum amount of acceptable uncertainty in any given query answer; and
- the method further comprises calculating the prescribed threshold based upon the user-defined certainty threshold.

21. The non-transitory computer-readable storage medium of claim 19, wherein
the step of identifying potential answers to the query further comprises processing the query over the incomplete data set to identify the potential answers, each potential answer comprising a variable in a given graph in at least one of the subject node, the object node and the predicate of that given graph that can yield the two or more potential values.

22. The non-transitory computer-readable storage medium of claim 21, wherein:
- the method further comprises creating an uncertain graph data set by substituting alternative values for all variables in the incomplete data graph, wherein each variable is replaced by a given group of alternative values, each group of alternative values selected from a set of alternative values comprising a union of all subsets of a set of all uniform resource identifiers in the received graph data and all subsets of a set of all literals in the received graph data; and
- the step of identifying the certain potential answers to the query further comprises evaluating the variable associated with each potential answer using the uncertain graph data set to identify variables having the number of potential values below the prescribed threshold.

* * * * *